Sept. 17, 1963    K. J. CROOK    3,103,681

SHOE SCRAPER FOR MOTOR VEHICLES

Filed Dec. 8, 1961

INVENTOR.
KENNETH J. CROOK
BY
Gregory S. Dolgorukov
ATTORNEY

United States Patent Office 3,103,681
Patented Sept. 17, 1963

3,103,681
SHOE SCRAPER FOR MOTOR VEHICLES
Kenneth J. Crook, 10528 Sterritt, Detroit, Mich.
Filed Dec. 8, 1961, Ser. No. 157,940
6 Claims. (Cl. 15—237)

This invention relates to motor vehicles and more particularly to a shoe cleaner for motor vehicles, which can be made as an accessory or as a part of a vehicle structure.

The present day motor vehicle, particularly of the passenger type, has developed through changes of almost half a century from a "horseless carriage" which was, in effect, a conventional carriage of those days with a gasoline engine attached to it. For many years motor vehicles retained many of the features of such carriages relating to accommodation of the passengers, either in their original form or in a modified form. One of such features was a step bracket for getting in and out of the carriage, which gradually took the shape of a "running board" provided at the doors on both sides of motor vehicles.

Such running board, in addition to providing a step for getting into the vehicle, also provided means for cleaning shoes or overshoes of mud and snow merely by stamping several times on such running board to loosen or shake off the mud or snow before stepping into the vehicle. Although running boards were ineffective to clean shoes completely, they were effective to enable the vehicle operator or passengers to shake off most of the snow or mud from the shoes.

Development of motor vehicles within the last 20 years proceeded, among other things, along the lines of lowering the entire vehicle including its floor for improving stability of the vehicle, particularly at higher speeds. In the present day motor vehicle the floor is almost at the height of the old running board, leaving no room for the provision of the latter. As a result, the vehicle operator and passengers now have to step directly from the ground into the floor of the motor vehicle, bringing in on their shoes the snow and mud. The vehicle operator usually gets into the vehicle from the left side thereof and, therefore, has to go around the vehicle on the road to get into his seat. In winter he may often have to get into deep snow and in the spring and fall in mud. As a result, a considerable amount of snow or mud is brought into the vehicle, and in operation of the vehicle the operator has to stamp his feet repeatedly in melting snow or mud. Such a condition is very objectionable for many reasons. Not only does it dirty the vehicle, but it promotes contraction of colds by keeping the shoes of the operator and passengers wet in cold weather.

In spite of such difficulties, the condition explained above has been accepted in this industry as unavoidable and as not susceptible of being corrected, and for many years no practicable solution thereto was provided.

One of the objects of the present invention is to provide an improved construction which may be embodied into a motor vehicle structure as a part thereof or attached to it as an accessory, both to the original equipment as well as to vehicles already on the road, whereby the above difficulties and disadvantages are overcome and largely eliminated without introducing other problems or increasing appreciably the costs involved.

Another object of the present invention is to provide a shoe scraper for a motor vehicle enabling the vehicle operator or passenger to clean his shoes of most of the snow and mud carried on his shoes; a person may clean both shoes before stepping into the vehicle or, if preferred, to clean only one shoe before stepping into the vehicle and the other shoe while already in the seat.

A further object of the present invention is to provide a shoe scraper for an automobile including means whereby the scraped mud and snow are directed on the road rather than permitted to accumulate in any particular place inside the vehicle.

A still further object of the present invention is to provide a shoe scraper for motor vehicles which does not obstruct the entry and exit into and from the vehicle, does not protrude outwardly to provide danger, has no sharp edges on which clothing may catch, and is susceptible of pleasing design merging or harmonizing with that of the entire vehicle.

A still further object of the present invention is to provide a shoe scraper for motor vehicles which is simple and rugged in construction, is inexpensive to manufacture and easy to install in a motor vehicle.

Further objects and advantages of this invention will be apparent from the following description and appended claims, reference being had to the accompanying drawing forming a part of this specification, wherein like reference characters designate corresponding parts in the several views.

Figure 1:
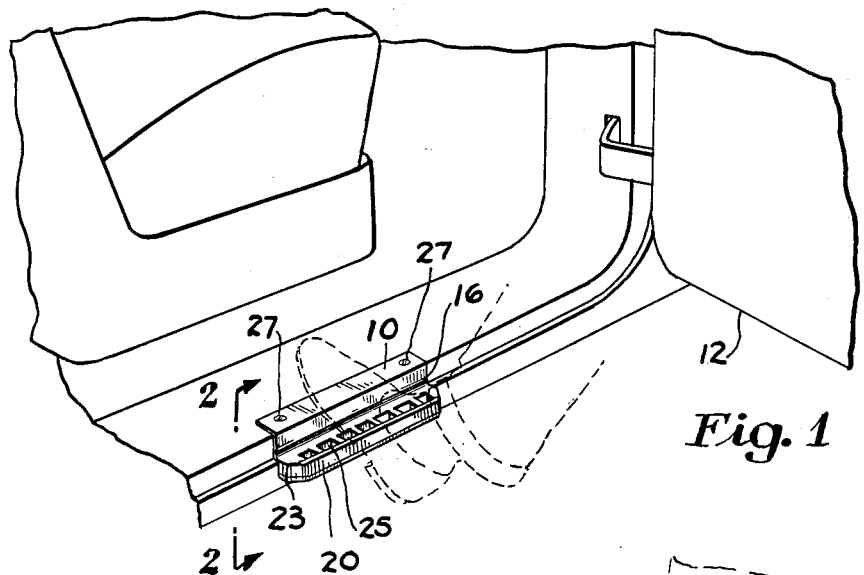
FIG. 1 is a perspective view of a portion of a motor vehicle having the shoe scraper embodied in the present invention installed thereon. The use of the shoe scraper is illustrated by indicating in dotted lines the lower portion of the user's leg in the process of scraping his shoes.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

In the drawing there is shown, by way of example, a shoe scraper embodying the present invention. The shoe scraper illustrated and described herein is in the form of a separate accessory. It will be understood, however, that the present invention is not limited to such form, and that my shoe scraper may be embodied into the construction of the vehicle as a part of its other members.

Figure 2:
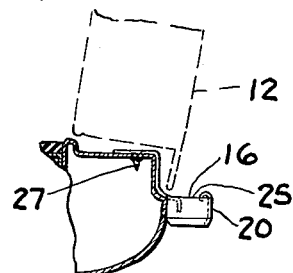
FIG. 2 is a fragmentary sectional view taken in the direction of the arrows on the section plane passed transversely of the vehicle through the section line 2—2 of FIG. 1.
Figure 3:
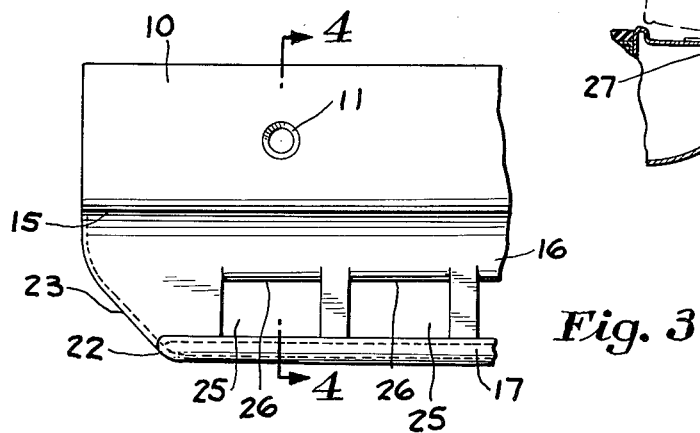
FIG. 3 is a top view of a portion of the shoe scraper on a larger scale.
Figure 4:
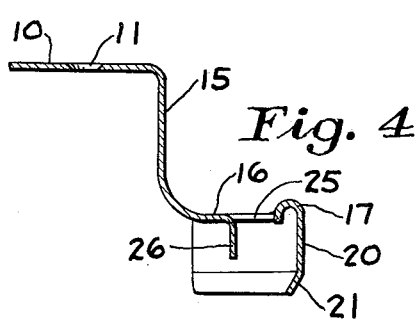
FIG. 4 is a sectional view taken in the direction of the arrows on the section plane passed through line 4—4 of FIG. 3.

Referring specifically to the drawing, the shoe scraper illustrated therein comprises a flange 10 provided with screw holes 11 and thus adapted for attachment to the edge of a motor vehicle, which edge is disposed under the lower edge of the door 12 in the closed position thereof, as is best shown in FIG. 2. A bridge portions 15 of the L-shaped cross section merges at its upper edge with the outer edge of the flange 10, and extends downwardly and outwardly therefrom to bring its horizontal or outer portion 16 to overhang the road, as is shown in FIGS. 2 and 4.

A scraping ridge 17 is provided along the outer edge of the portion 16 to extend substantially throughout its entire length. While such scraping ridge may be made in the form of an upturned flange, I prefer to make it in the form of a raised bead, as illustrated, with the outer edge of the bead merging with a downwardly depending flange 20 provided with the inwardly directed flange or lip 21, see FIG. 4. The corners of the horizontal portion 16 are rounded as indicated at 22, and the depending flange 20 is bent around such corners as is shown at 23 to provide rounded ends on the outwardly protruding portion of the shoe scraper and thus to provide a well rounded construction and to eliminate protruding sharp corners. Such construction may be attained by forming, or by notching the ends of the blank to provide rounded corner on the portion 16 and bending the ends of the flange 20 around said corner.

A plurality of openings 25 are provided in the horizontal portion along the scraping ridge 17, and, therefore, in the portion of the shoe scraper overhanging the road, as illustrated, to direct the scraped matter, dirt and mud, directing it on the road. I prefer to provide such openings by punching out the material of the shoe scraper on three sides to form tongues 26 and to have such tongues pushed downwardly, thus providing, in effect, a plurality of louvers. Such a construction presents a more pleasing appearance and is stronger.

The shoe scraper is secured to the vehicle with the aid of screws 27 preferably at each door. However, in many instances, it may be sufficient to attach only one such scraper under the left front door of the vehicle for the use of the vehicle operator since it is the vehicle operator who usually has to step on the road to get into his seat. Getting into the operator's seat from the right side of the vehicle is rather difficult. In the use of the device, a person using the same may scrape the shoes on both feet before stepping into the vehicle, or only the shoe of the foot which has to be placed into the vehicle first and thereupon scrape the other shoe while already in the seat. For a passenger stepping into the seat from the right side of the vehicle and stepping in with the left foot first, the left foot would be scraped first; thereupon the passenger would get into the seat and scrape the right foot. Such a procedure is, of course, a matter of convenience as determined by the height and other physical characteristics of a person, and some variations therein may be expected.

In case of particularly heavy snow or mud, a considerable amount of snow or mud may accumulate on the portion 16. In such case the user may sweep off such dirt with any object such as the heel of the shoe or with the window scraper or merely a stick of wood kept in the vehicle for that purpose. The dry dirt is easily blown away from the scraper by the wind or by action of the air during the travel of the vehicle.

My shoe scraper may be made of any suitable material. I prefer to make it as a single piece from sheet aluminum approximately 1/16" in thickness. Such material is stamped and formed easily, does not rust, and is sufficiently strong to provide a reliable construction. However, other material, such as stainless steel, may also be used with success.

There is thus provided a shoe scraper for motor vehicles whereby the objects of the present invention listed above and numerous additional advantages are attained.

I claim:
1. A shoe scraper comprising a flange for attachment to a motor vehicle at an edge thereof disposed under the lower edge of the door in the closed position thereof, a bridge portion secured to said flange and extending downwardly and outwardly therefrom to have its outer portion overhang the road and disposed outside of the vehicle contour in the closed position of the door, a scraping ridge provided on said portion, openings being provided on said outer portion adjacent said ridge to discharge the scraped matter on the road, and a downwardly depending flange forming substantially a continuation of the outer side of said ridge and bent inwardly around the ends of said ridge to form rounded ends on said shoe scraper and to reach the structure of the vehicle and bear thereon for rigidity of support.

2. A shoe scraper comprising a flange for attachment to a motor vehicle at an edge thereof disposed under the lower edge of the door in the closed position thereof, a bridge portion secured to said flange and extending downwardly and outwardly therefrom to have its outer portion overhang the road and to be disposed outside of the vehicle contour, a scraping ridge provided on said portion and a plurality of louvers provided in said bridge portion adjacent said ridge and adapted to discharge the scraped matter on the road, and a downwardly depending flange provided along said scraping ridge, said flange being bent inwardly around the ends of said ridge to provide rounded corners.

3. A one-piece shoe scraper made of sheet material by stamping operation and comprising a connecting portion adapted for attachment to a motor vehicle at an edge thereof disposed under the lower edge of the door in the closed position thereof, a bridge portion merging with said connecting portion and extending downwardly and outwardly therefrom to have its outer portion overhang the road and to be disposed outside of the vehicle contour, a scraping ridge formed along the outer edge of said bridge portion, said bridge portion being provided along said ridge with a plurality of openings to discharge the scraped matter on the road, and a downwardly depending flange provided along said scraping ridge, said flange being bent inwardly around the ends of said ridge to provide rounded corners and adapted to substantially bear on the structure of the vehicle to imply rigidity to the shoe scraper in the installed position thereof.

4. A one-piece shoe scraper made of sheet material by stamping operation and comprising a connecting portion adapted for attachment to a motor vehicle at an edge thereof disposed under the lower edge of the door in the closed position thereof, a bridge portion merging with said connecting portion and extending downwardly and outwardly therefrom to have its outer portion overhang the road, a scraping ridge formed along the outer edge of said bridge portion, said bridge portion being provided along said ridge with a plurality of openings to discharge the scraped matter on the road, with the portion provided with said opening being disposed outside of the vehicle contour and a downwardly depending flange provided along said scraping ridge, and having inwardly extending extremities to provide rounded corners, and substantially bear on the vehicle structure for rigidity.

5. The shoe scraper for motor vehicles defined in claim 4, with the bridge portion having L-shaped cross section and with its horizontal portion having rounded corners.

6. In a motor vehicle, a shoe scraper provided on the edge of the vehicle floor which is under the lower edge of the door in the closed position thereof, said shoe scraper including a portion extending outwardly under the lower edge of the door to overhang the road, a scraping ridge provided on said portion, said overhanging portion being provided with a plurality of openings adjacent said ridge to direct the scraped matter on the road, the portion provided with said opening being disposed outside of the vehicle contour, and a downwardly depending flange provided along said scraping ridge, said flange being bent inwardly around the ends of said ridge to provide rounded corners.

References Cited in the file of this patent
UNITED STATES PATENTS

| | | |
|---|---|---|
| 1,037,252 | Holmes | Sept. 3, 1912 |
| 1,655,988 | Doran | Jan. 10, 1928 |
| 2,296,629 | Coppock | Sept. 22, 1942 |
| 2,692,144 | Wofford | Oct. 19, 1954 |